(12) United States Patent
Hong

(10) Patent No.: US 7,898,132 B2
(45) Date of Patent: Mar. 1, 2011

(54) MOTOR ASSEMBLY

(75) Inventor: Sung-Jin Hong, Incheon (KR)

(73) Assignee: Dongyang Mechatronics Corp., Incheon (KR)

( * ) Notice: Subject to any disclaimer, the term of this patent is extended or adjusted under 35 U.S.C. 154(b) by 329 days.

(21) Appl. No.: 12/295,291

(22) PCT Filed: Nov. 6, 2006

(86) PCT No.: PCT/KR2006/004586

§ 371 (c)(1),
(2), (4) Date: Sep. 30, 2008

(87) PCT Pub. No.: WO2007/119915

PCT Pub. Date: Oct. 25, 2007

(65) Prior Publication Data

US 2009/0160278 A1   Jun. 25, 2009

(30) Foreign Application Priority Data

Apr. 19, 2006   (KR) .................. 10-2006-0035322

(51) Int. Cl.
*H02K 5/16* (2006.01)
*F16C 43/00* (2006.01)
(52) U.S. Cl. ........................... 310/90; 384/539
(58) Field of Classification Search .......... 310/90; 384/537, 539, 584, 585, 559, 903
See application file for complete search history.

(56) References Cited

U.S. PATENT DOCUMENTS 5,027,024 A * 6/1991 Slayton ............... 310/90
5,216,929 A   6/1993 Ochaiai et al.
6,288,466 B1 * 9/2001 Lauk et al. ............... 310/91

FOREIGN PATENT DOCUMENTS

| JP | 2003-113909 | 4/2003 |
|---|---|---|
| JP | 2004-224303 | 8/2004 |
| KR | 1020040068650 | 8/2004 |

* cited by examiner

*Primary Examiner*—Quyen Leung
*Assistant Examiner*—Eric Johnson
(74) *Attorney, Agent, or Firm*—Jason Y. Pahng

(57) ABSTRACT

Provided is a motor assembly including a supporting body; a bearing member including an inner race and an outer race; and a supporting unit for supporting the bearing member onto the supporting body, wherein the supporting body comprises: a receiving portion with an opening on a portion in the diameter direction of the output shaft for receiving the bearing member having a first supporting surface disposed perpendicularly to the output shaft of the motor and a second supporting surface separated from the first supporting surface in parallel to the first supporting surface; a side surface of the outer race of the bearing member contacts the first supporting surface, the supporting unit includes a bearing sheet that is forcedly inserted between the other side surface of the outer race in the bearing member that is received in the receiving portion and the second supporting surface, wherein the bearing sheet includes a radial supporting portion contacting an outer circumferential surface of the bearing member received in the receiving portion so as to prevent the bearing member from escaping from the receiving portion.

5 Claims, 7 Drawing Sheets

MOTOR ASSEMBLY

TECHNICAL FIELD

The present invention relates to a motor assembly used as a driving source for an automobile device such as a windshield wiper, and more particularly, to a motor assembly having an improved structure for supporting a thrust of an output axis of a motor.

BACKGROUND ART

A motor assembly is used, for example, for driving a windshield wiper. In this case, the driving motor assembly is connected to a link device. Referring to FIG. 1, the motor assembly generally includes a supporting body 2, a motor 3, a worm 5, and a worm wheel 6. The motor 3 is supported by the supporting body 2. The worm 5 is disposed on an output shaft 4 of the motor 3. The worm wheel 6 is supported by the supporting body 2 to be rotatable engaged with the worm 5. The link device (not shown) is connected to the worm wheel 6. In addition, the windshield wiper (not shown) is connected to the link device. Thus, when the output shaft 4 of the motor 3 rotates, the worm 5 and the worm wheel 6, which is engaged with the worm 5, rotate too. The rotary force of the worm wheel 6 is transmitted to the windshield wiper through the link device so that the windshield wiper reciprocates to wipe out the windshield.

When the windshield wiper reciprocates by the operation of the motor 3, in more detail, at the time when the moving direction of the windshield wiper reverses, a large thrust is generated on the output shaft 4 of the motor 3. Therefore, the thrust of the output shaft 4 of the motor 3 should be supported by the driving motor assembly 1.

Thus, the conventional wiper driving motor assembly 1 includes a bearing member 7, an inner race 8 of which is fixed on the output shaft 4 of the motor 3 using a fixing ring (not shown), as shown in FIG. 1. In addition, as shown in FIGS. 1 through 3, an outer race 9 of the bearing member 7 is fixed on the supporting body 2 to support the thrust generated on the output shaft 4 of the motor 3. An additional bearing sheet 100 is inserted between a side surface of the bearing member 7 and the supporting body 2 as a structure for supporting the thrust generated on the output shaft 4 of the motor 3. The bearing sheet 100 supports elastically the bearing member 7 toward the output shaft 4 of the motor 3. In more detail, as shown in FIGS. 2 and 3, a receiving portion 101 formed on the supporting body 2 includes a first supporting surface 102 and a second supporting surface 103. The outer race 9 of the bearing member 7 contacts the first supporting surface 102, and a part of the bearing sheet 100 contacts the second supporting surface 103 to prevent the bearing member 7 from moving toward the output shaft 4 of the motor 3. The receiving portion 101 prevents the bearing member 7 from moving in a radial direction of the bearing member 7. Therefore, the bearing sheet 100 only prevents the bearing member 7 from moving toward the output shaft 4 of the motor 3.

DISCLOSURE OF INVENTION

Technical Problem

In the conventional structure for supporting the bearing member 7, the receiving portion 101 preventing the bearing member 7 from moving in the radial direction is disposed on the supporting body 2. Referring to FIG. 2, the receiving portion 101 is formed as a cylinder so as to have a closed cross-section in the supporting body 2. The bearing member 7 is coupled to the output shaft 4 of the motor 3. The worm wheel 6 is coupled to a rotary shaft 6a. A hole for installing the rotary shaft 6a is formed in the worm wheel 6. The central axes of the cylindrical receiving portion 101 for installing the bearing member 7 and the hole are perpendicular to each other. Therefore, the receiving portion 101 and the hole for installing the rotary shaft of the worm wheel 6 cannot be formed using a single die. Thus, the receiving portion 101 and the hole for installing the rotary shaft 6a of the worm wheel 6 are formed using separate cutting processes. Then, an additional cutting process is required in order to process the cylindrical receiving portion 101 accurately. Consequently, the manufacturing cost of the driving motor assembly 1 increases, and in addition, due to machining and assembling errors, the distance between the rotary shaft 6a of the worm wheel 6 and the output shaft 4 of the motor 3 is not constant, which degrades the performance of the motor assembly 1.

Technical Solution

The present invention provides a motor assembly having an improved structure for supporting a thrust on an output shaft of a motor, preventing the motor from moving in a radial direction of the output shaft, having low manufacturing cost, and reducing distance variations between elements due to assembling errors.

According to an aspect of the present invention, there is provided a motor assembly including: a supporting body; a motor supported by the supporting body; a worm disposed on an output shaft of the motor; a worm wheel supported by the supporting body to be rotatable engaged with the worm; a bearing member including an inner race and an outer race and fixed by coaxially inserting the output shaft of the motor into the inner race; and a supporting unit for supporting the bearing member onto the supporting body, wherein the supporting body includes: a receiving portion with an opening on a portion in the diameter direction of the output shaft for receiving the bearing member having a first supporting surface disposed perpendicularly to the output shaft of the motor; a second supporting surface separated from the first supporting surface in parallel to the first supporting surface; a side surface of the outer race of the bearing member contacts the first supporting surface of the receiving portion, the supporting unit includes a bearing sheet that is forcedly inserted between the other side surface of the outer race in the bearing member that is received in the receiving portion and the second supporting surface of the receiving portion, wherein the bearing sheet includes a radial supporting portion contacting an outer circumferential surface of the bearing member received in the receiving portion so as to prevent the bearing member from escaping from the receiving portion along the radial direction of the output shaft of the motor.

ADVANTAGEOUS EFFECTS

As described above, in the motor assembly according to the present invention, the fixing structure of the bearing member for supporting the thrust generated on the output shaft of the motor is improved, that is, the receiving portion receiving the bearing member is formed to have an opening, and the bearing sheet is forcedly inserted into the opening of the receiving portion, and thus, the movement of the bearing member in the central shaft direction of the output shaft due to the thrust of the motor can be prevented. In addition, the movement of the bearing member in the radial direction of the output shaft of the motor can be also prevented. In addition, the costs for fabricating the motor assembly can be reduced due to the open structure of the receiving portion, and the quality of the motor assembly can be improved.

DESCRIPTION OF DRAWINGS

The above and other features and advantages of the present invention will become more apparent by describing in detail exemplary embodiments thereof with reference to the attached drawings in which.

BEST MODE

Figure 4:
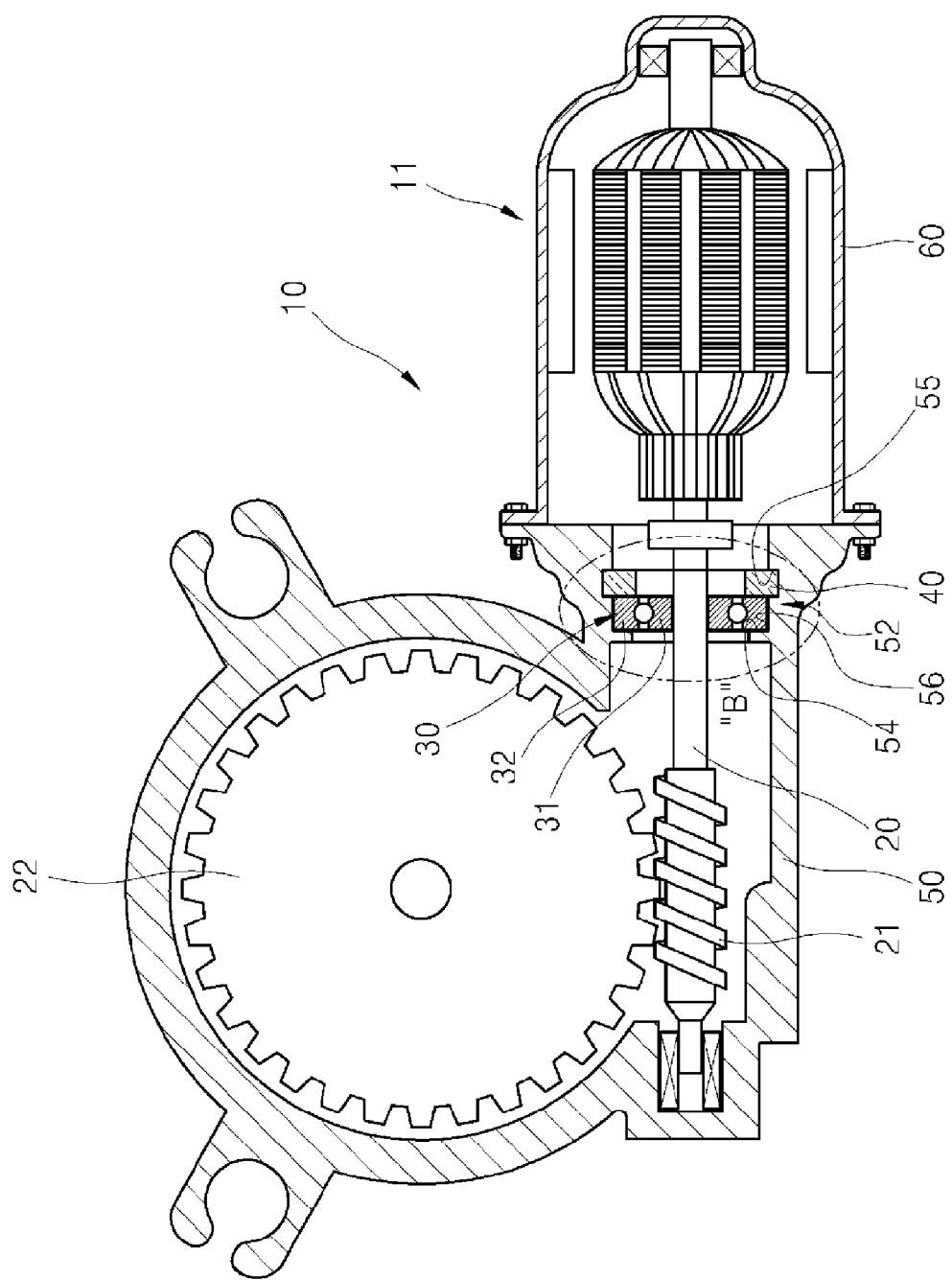
FIG. 4 is a schematic plan view of a motor assembly according to an embodiment of the present invention.
Figure 5:
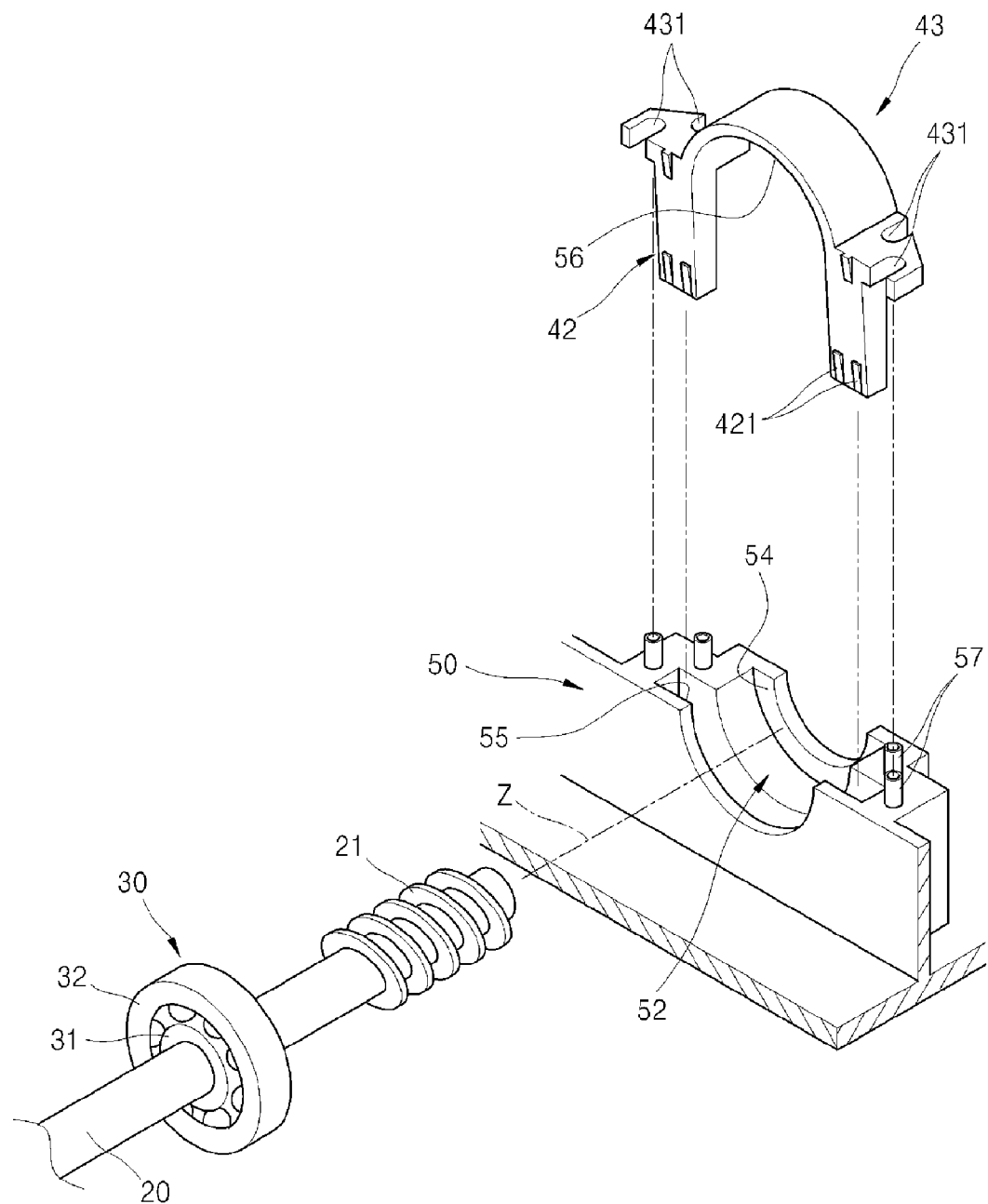
FIG. 5 is a schematic exploded perspective view of part 'B' in FIG. 4.
Figure 6:
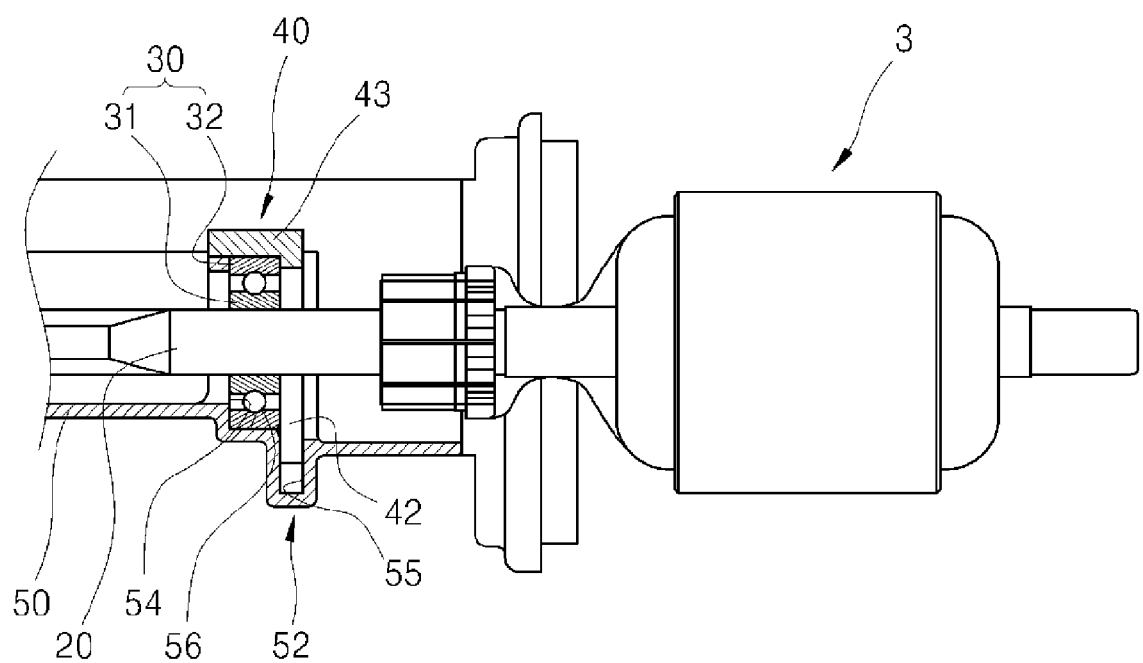
FIG. 6 is a cross-sectional view illustrating an assembling structure of a bearing sheet in the motor assembly of FIG. 4.
Figure 7:
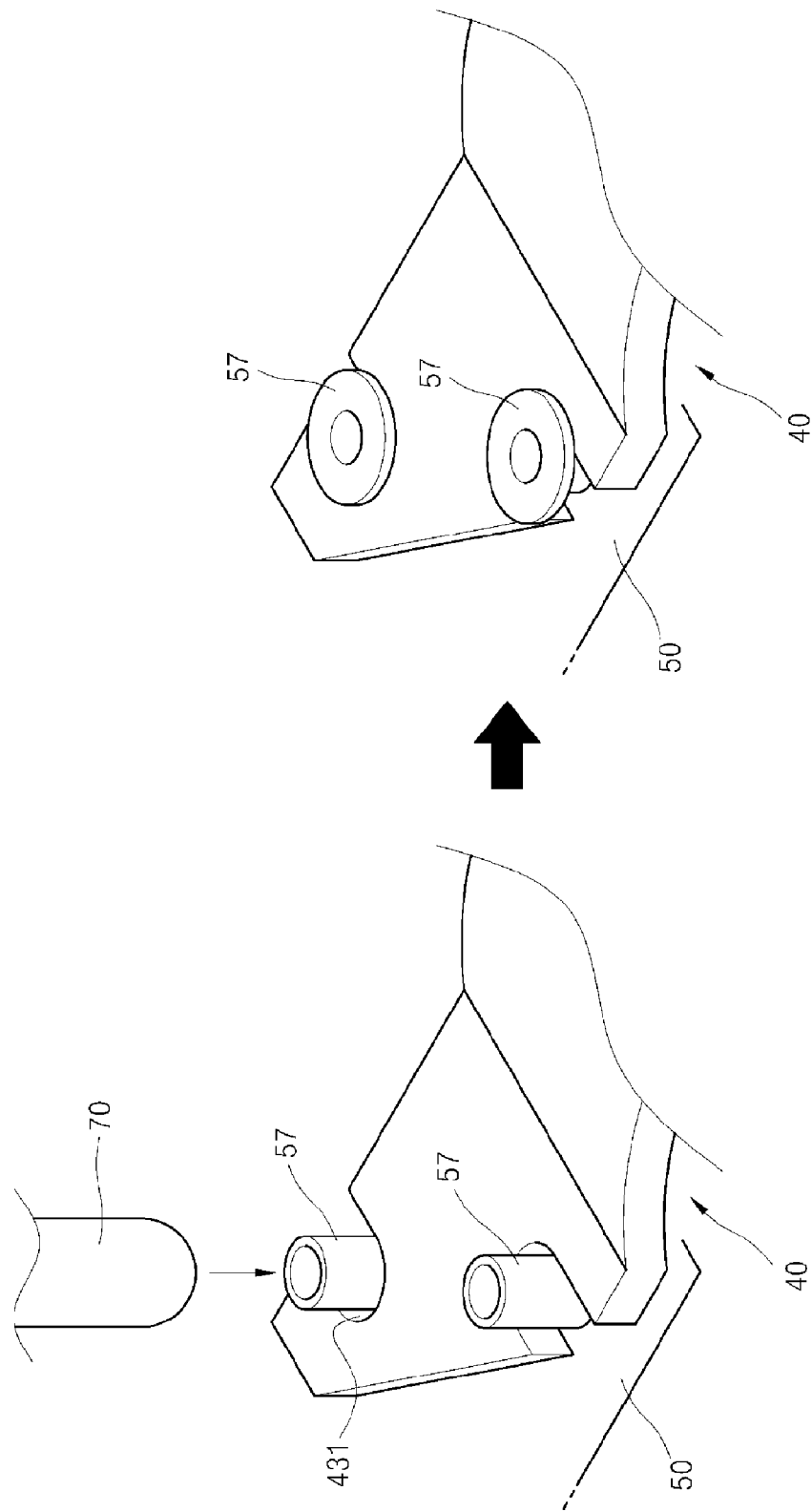
FIG. 7 is a view illustrating a coupling structure between the bearing sheet and a supporting body using a caulking process in the motor assembly of FIG. 4.

FIG. 4 is a schematic plan view of a motor assembly according to an embodiment of the present invention, and FIG. 5 is a schematic exploded perspective view of part 'B' in FIG. 4. FIG. 6 is a cross-sectional view illustrating an assembling structure of a bearing sheet in the motor assembly of FIG. 4, and FIG. 7 is a view illustrating a coupling structure between the bearing sheet and a supporting body using a caulking process in the motor assembly of FIG. 4.

Referring to FIGS. 4 through 7, a motor assembly 10 of the current embodiment includes a supporting body 50, a motor 11 supported by the supporting body 50, a worm 21 disposed on an output shaft 20 of the motor 11, and a worm wheel 22 supported by the supporting body 50 to be rotatable engaged with the worm 21. In addition, a link device (not shown) can be connected to the worm wheel 22, and a windshield wiper (not shown) is connected to the link device. Therefore, when the output shaft 20 of the motor 11 rotates, the worm 21 and the worm wheel 22, which is engaged with the worm 21, rotate too, and then, the rotary force of the worm wheel 22 is transmitted to the windshield wiper through the link device to drive the windshield wiper.

Figure 1:
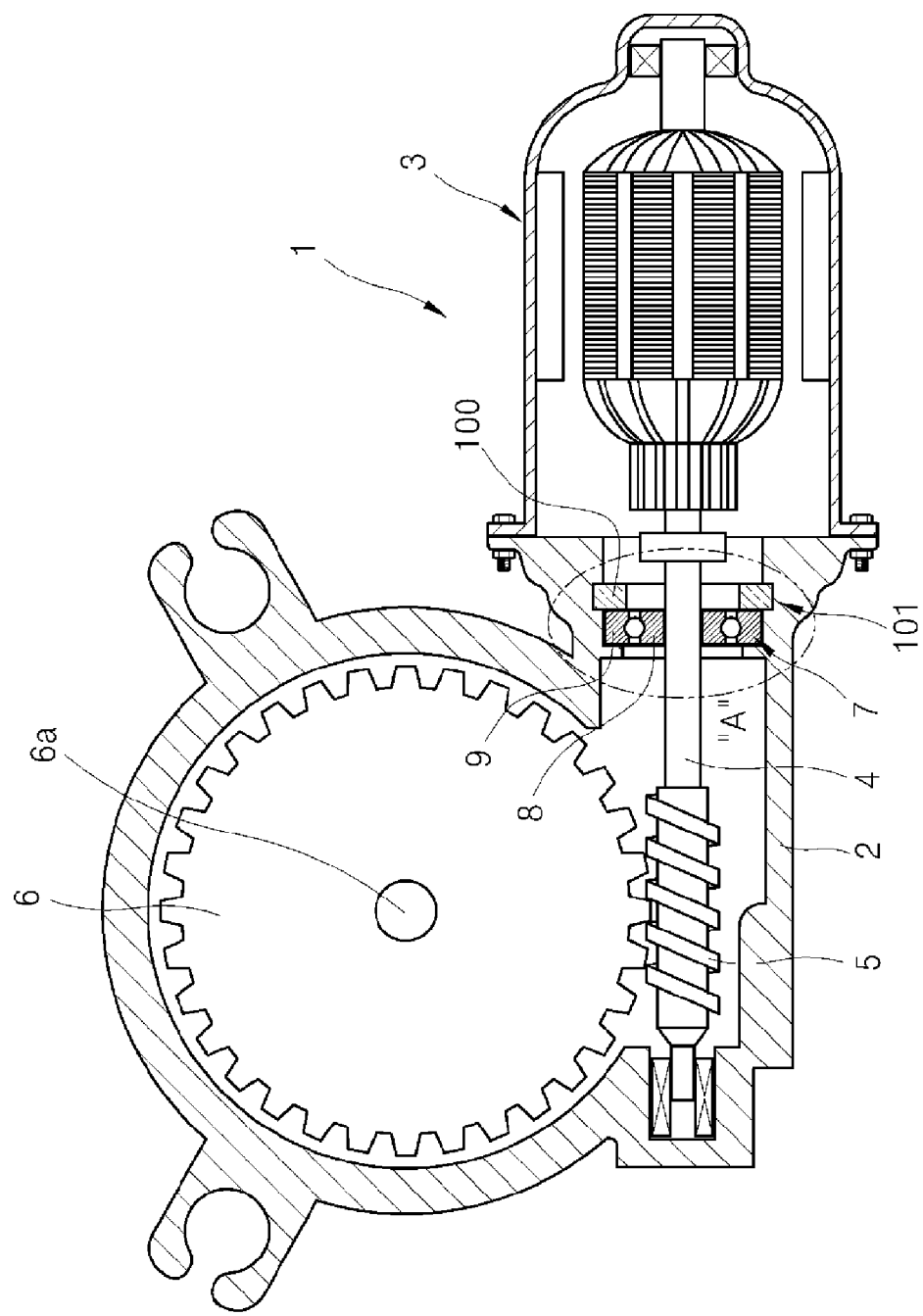
FIG. 1 is a schematic plan view of a conventional motor assembly.
Figure 2:
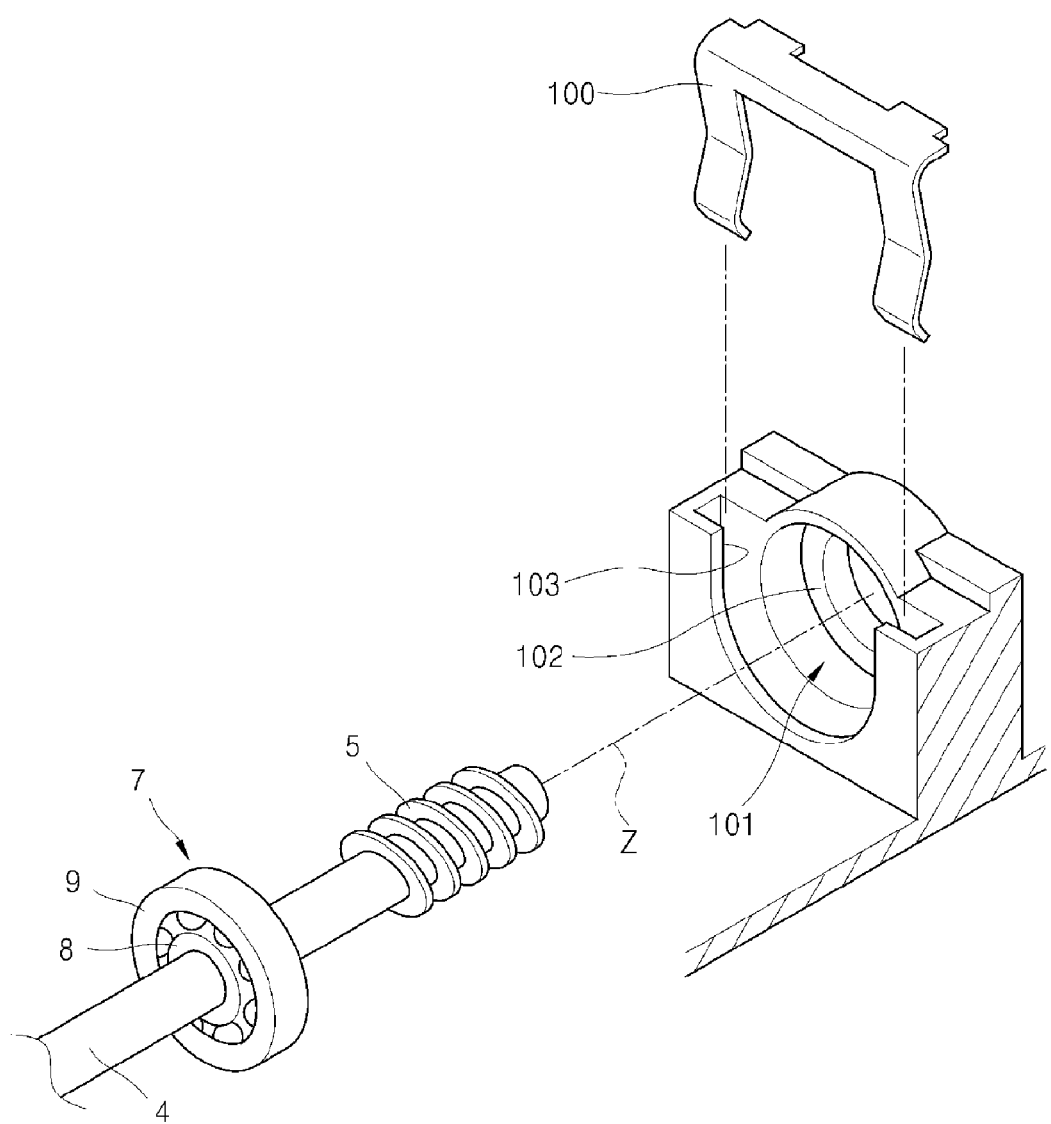
FIG. 2 is a schematic exploded perspective view showing part 'A' of FIG. 1.
Figure 3:
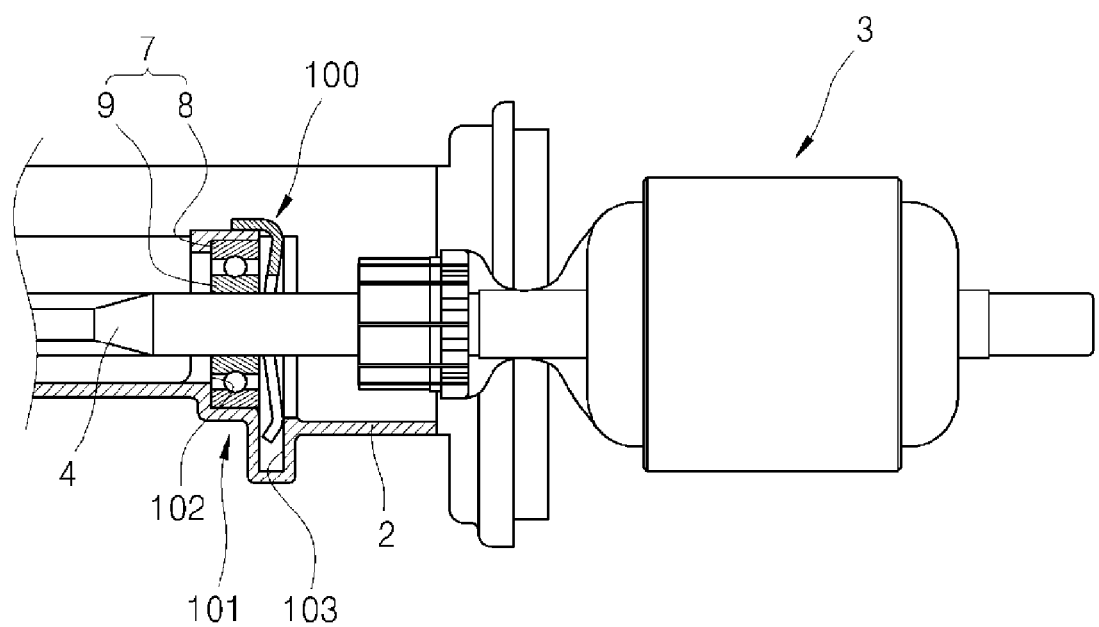
FIG. 3 is a cross-sectional view illustrating an assembling structure of a bearing sheet in the motor assembly of FIG. 1.

In the motor assembly 10 according to the current embodiment, when an external device (not shown) such as the windshield wiper is driven by the operation of the motor 11, a structure for supporting a thrust generated on the output shaft 20 of the motor 11 by the driven device is different from that of the conventional motor assembly 1 shown in FIG. 2.

That is, in the motor assembly 10 of the current embodiment, a bearing member 30, a receiving portion 52 formed on the supporting body 50, and a bearing sheet 40 coupled to the receiving portion 52 are included to support the thrust on the output shaft 20 of the motor 11.

The bearing member 30 includes an inner race 31 and an outer race 32, and the inner race 31 and the outer race 32 are coupled to each other by interposing a steel ball therebetween. The output shaft 20 of the motor 11 is coaxially inserted into the inner race 31 of the bearing member 30 to be fixed therein, and a fixing ring (not shown) can be inserted into the output shaft 20 as a fixing unit. The bearing member 30 is assembled in the supporting body 50 by a receiving portion 52 and a bearing sheet 40 that will be described later.

The receiving portion 52 is formed to receive the bearing member 30. The receiving portion 52 is opened toward one of radial directions of the output shaft 20 of the motor 11. The receiving portion 52 includes a first supporting surface 54 and a second supporting surface 55. The first supporting surface 54 is formed perpendicularly to a central axis (Z) of the output shaft 20 of the motor 11. The first supporting surface 54 contacts a side surface of the outer race 32 of the bearing member 30 so that the bearing member 30 do not move in the central axis (Z) direction of the output shaft 20 of the motor 11. The second supporting surface 55 faces the other surface of the outer race 32 of the bearing member 30. In more detail, the second supporting surface 55 is separated from the first supporting surface 54 and disposed in parallel to the first supporting surface 54. The second supporting surface 55 contacts the bearing sheet 40 to support the bearing sheet 40 that will be described later. In more detail, the receiving portion 52 receives the bearing member 30 and the bearing sheet 40, and the bearing sheet 40 is disposed between the bearing member 30 and the second supporting surface 55. Caulking projections 57 are formed around the opening portion of the receiving portion 52.

The bearing sheet 40 is a supporting unit for supporting the outer race 32 of the bearing member 30 onto the supporting body 50. The bearing sheet 40 includes a thrust supporting portion 42 and a radial supporting portion 43. A side surface of the thrust supporting portion 42 contacts the outer race 32 of the bearing member 30, and the other surface of the thrust supporting portion 42 is supported by the second supporting surface 55. A plurality of protrusions 421 are formed on the other side of the thrust supporting portion 42. The protrusions 421 are formed on the surface of the thrust supporting portion 42 facing the second supporting surface 55. The protrusions 421 are deformed and adhered onto the second supporting surface 55 when the bearing sheet 40 is forcedly inserted between the outer race 32 of the bearing member 30 and the second supporting surface 55. The radial supporting portion 43 includes a radial supporting surface 56. The radial supporting surface 56 is a portion that comes in contact with an outer circumference of the outer race 32 of the bearing member 30. The radial supporting surface 56 contacts the outer circumferential surface of the outer race 32 of the bearing member 30 to prevent the bearing member 30 from moving in the radial direction of the output shaft 20 of the motor 11 with the receiving portion 52. The radial supporting portion 43 includes a plurality of caulking recesses 431 to be coupled to the caulking projections 57. Referring to FIG. 7, the caulking recesses 431 are permanently deformed by a caulking jig 70 so that upper ends of the caulking projections 57 corresponding to the caulking recesses 431 are projected by the upper surface of the bearing sheet 40, and thus, the bearing sheet 40 can be firmly fixed on the supporting body 50. The bearing sheet 40 is formed of a zinc alloy. The bearing sheet 40 can be fabricated by processing the zinc alloy using a die casting method. In general, the die casting method is an accurate casting method, in which molten metal is injected into a die made of steel that is mechanically processed to form the required cast shape to obtain a cast-iron product that is the same as the die. This product is referred to as a die-cast product. The cast product can be accurately made in the die-casting method, and thus, there is no need to trim the product. In addition, the die-cast products have superior mechanical properties, and can be mass-produced.

Assembling processes and operation of the motor assembly 10 having the above structure are as follows.

The bearing member 30 is fixed on the output shaft 20 using two fixing rings (not shown) not to move in the central shaft direction (Z) thereof.

Then, the bearing member 30 is moved toward the supporting body 50 along the central shaft of the output shaft 20 of the motor 11 so that a side surface of the bearing member 30 contacts the first supporting surface 54 of the receiving portion 52. In this state, the bearing sheet 40 is inserted in the radial direction of the output shaft 20 of the motor 11 from the opening of the receiving portion 52 so that the bearing sheet 40 can be forcedly inserted between the surface of the outer race 32 of the bearing member 30 and the second supporting surface 55. During the bearing sheet 40 is inserted into the receiving portion 52, the plurality of protrusions formed on the thrust supporting portion 42 of the bearing sheet 40 are plastically deformed to fix the outer race 32 of the bearing member 30 into the receiving portion 52 firmly. Meanwhile, the radial supporting surface 56 contacts the outer race 32 of the bearing member 30 while surrounding the outer circumferential surface of the outer face 32 to prevent the bearing member 30 from moving in the radial direction of the output shaft 20 of the motor 11. In addition, the caulking projections 57 formed on the receiving portion 52 are transformed and fix the bearing sheet 40 firmly, and thus, the movement of the bearing member 30 in the diameter direction of the output shaft 20 in the motor 11 can be prevented. As described above, the output shaft 20 of the motor 11 fixes the bearing member 30 on the supporting body 50 using the receiving portion 52 and the bearing sheet 40, and then, other elements, for example, the worm wheel and cover are assembled to complete the motor assembly 10.

When the motor assembly 10 is connected to an external device, for example, a windshield wiper, and drives the windshield wiper, a shock generated by the change of a windshield wiper's moving direction is transmitted to the output shaft 20 of the motor 11 through the worm wheel 22 and the worm 21. At this time, the external force transmitted to the output shaft 20 acts as a thrust force to the output shaft 20, and thus, pushes or pulls the output shaft 20 in the central shaft (Z) direction. During the above process, the output shaft 20 is assembled on the inner race 31 of the bearing member 30 so as not to move in the central shaft (Z) direction, and the outer race 32 of the bearing member 30 that is connected to the inner race 31 through the steel ball is fixed by the bearing sheet 40 and the supporting body 50 so as not to move in the central shaft (Z) direction of the output shaft 20 and the diameter direction of the output shaft 20. Therefore, since the movement of the output shaft 20 in the central shaft (Z) direction due to the thrust transmitted from the outside is prevented, the output shaft 20 and the supporting body 50 or the output shaft 20 and a motor housing 60 do not contact each other even when the external force is applied to the output shaft 20 in the central shaft (Z) direction. Therefore, vibration or noise generated due to the contact is not generated.

As described above, since the supporting body 50 is fabricated with the opened receiving portion 52, the receiving portion 52 including the bearing member 30 does not need to be processed using an additional die or to be cut. Therefore, costs for fabricating the supporting body 50 can be reduced. In addition, the the distance variation between the rotary shaft coupled to the worm wheel 22 and the output shaft 20 of the motor 11 generated due to the additional cutting process can be prevented, and thus, the performance of the motor assembly 10 can be improved.

In addition, since the conventional bearing sheet is formed of an elastic material, the bearing sheet may be moved in the shaft direction of the output shaft by the thrust of the motor to some degree. However, according to the current embodiment, the bearing sheet 40 is fabricated using the die-casting method, and is coupled to the receiving portion 52 by being forcedly inserted into the receiving portion 52, and thus, the bearing sheet 40 hardly moves in the shaft direction of the output shaft 20 of the motor 11.

MODE FOR INVENTION

In the current embodiment, the bearing sheet 40 includes a plurality of protrusions on the surface facing the second supporting surface 55, and each of the protrusions is adhered onto the second supporting surface 55 when the bearing sheet 40 is forcedly inserted between the surface of the outer race 32 of the bearing member 30 and the second supporting surface 55 of the receiving portion 52. However, the present invention is not limited to the above example, and a surface of the thrust supporting portion 42 in the bearing sheet 40 can directly contact the second supporting surface 55.

In addition, the movement of the bearing sheet 40 in the radial direction of the output shaft 20 of the motor 11 from the receiving portion 52 is prevented by caulking some part of the supporting body 50 in the current embodiment, however a unit for preventing the bearing sheet 40 from escaping the receiving portion 52 in the radial direction of the output shaft 20 of the motor 11, for example, additional bolts and nuts for fixing the bearing sheet 40 in the supporting body 50, can be used in the present invention without using the caulking process.

In addition, according to the current embodiment, the bearing sheet 40 is formed of the zinc alloy material, however, the present invention is not limited to the zinc alloy material.

In the current embodiment, the bearing sheet 40 is fabricated using the die-casting method, however, the bearing sheet can be fabricated using a different method, for example, a forging method.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention provides a motor assembly having an improved structure for supporting a thrust on an output shaft of a motor, preventing the motor from moving in a radial direction of the output shaft, having low manufacturing cost, and reducing distance variations between elements due to assembling errors.

As described above, in the motor assembly according to the present invention, the fixing structure of the bearing member for supporting the thrust generated on the output shaft of the motor is improved, that is, the receiving portion receiving the bearing member is formed to have an opening, and the bearing sheet is forcedly inserted into the opening of the receiving portion, and thus, the movement of the bearing member in the central shaft direction of the output shaft due to the thrust of the motor can be prevented. In addition, the movement of the bearing member in the radial direction of the output shaft of the motor can be also prevented. In addition, the costs for fabricating the motor assembly can be reduced due to the open structure of the receiving portion, and the quality of the motor assembly can be improved.

The invention claimed is:

1. A motor assembly comprising:
   a supporting body;
   a motor supported by the supporting body;
   a worm disposed on an output shaft of the motor;
   a worm wheel supported by the supporting body to be rotatable engaged with the worm;
   a bearing member including an inner race and an outer race and fixed by coaxially inserting the output shaft of the motor into the inner race; and
   a supporting unit for supporting the bearing member onto the supporting body, wherein the supporting body comprises: a receiving portion with an opening on a portion in the diameter direction of the output shaft for receiving the bearing member having a first supporting surface disposed perpendicularly to the output shaft of the motor; a second supporting surface separated from the first supporting surface in parallel to the first supporting surface;
   a side surface of the outer race of the bearing member contacts the first supporting surface of the receiving portion,
   the supporting unit includes a bearing sheet that is forcedly inserted between the other side surface of the outer race of the bearing member that is received in the receiving portion and the second supporting surface of the receiving portion,
   wherein the bearing sheet includes a radial supporting portion contacting an outer circumferential surface of the bearing member received in the receiving portion so as to prevent the bearing member from escaping from the receiving portion along the radial direction of the output shaft of the motor.

2. The motor assembly of claim 1, wherein the bearing sheet includes a plurality of protrusion on a surface facing the second supporting surface of the receiving portion, and each of the protrusions is adhered onto a surface of the second supporting surface when the bearing sheet is forcedly inserted into the surface of the outer race of the bearing member and the second supporting surface of the receiving portion.

3. The motor assembly of claim 1, wherein the bearing sheet is prevented from escaping the receiving portion in the radial direction of the output shaft of the motor by caulking a part of the supporting body.

4. The motor assembly of claim 1, wherein the bearing sheet is formed of a zinc alloy.

5. The motor assembly of claim 4, wherein the bearing sheet is fabricated using a die-casting method.

* * * * *